J. L. MAJOR.
DISTILLATION OR EVAPORATION OF LIQUIDS.
APPLICATION FILED JAN. 19, 1918.

1,415,667.

Patented May 9, 1922.

Inventor
John Lewis Major
by
W. E. Evans
Attorney.

UNITED STATES PATENT OFFICE.

JOHN LEWIS MAJOR, OF SCULCOATES, HULL, ENGLAND.

DISTILLATION OR EVAPORATION OF LIQUIDS.

1,415,667.  Specification of Letters Patent.  Patented May 9, 1922.

Application filed January 19, 1918. Serial No. 212,751.

*To all whom it may concern:*

Be it known that I, JOHN LEWIS MAJOR, a subject of the King of Great Britain and Ireland, residing at Sculcoates, Hull, in the county of York, England, have invented certain new and useful Improvements Relating to the Distillation or Evaporation of Liquids, of which the following is a specification.

This invention relates to the distillation or evaporation of liquids.

The invention is especially applicable to simple stills and has for its object to render them readily adapted for continuous distillation, and the invention is also especially applicable in the distillation of tar and petroleum but it is of general application to the distillation of volatile liquids and in particular to liquids consisting of mixtures of substances having different boiling points or to such mixtures containing constituents of relatively low volatility and partly or wholly insoluble in the other constituents.

According to the invention the liquid to be distilled is fed into the still in a plurality of streams through a number of pipes extending from the bottom up through the liquid in the still so that the liquid in passing through the pipes is gradually heated to the temperature necessary to produce or to commence the distillation required, the liquid being then discharged in the upper part of the still where the lighter vapours are disengaged before the liquid passes into the still to be further heated.

Advantageously I may dispose the pipes so as to discharge the incoming liquid or tar from their orifices into a tray disposed horizontally in the still above the level of the main body of liquid and to cause the incoming liquid to flow over the edge of the tray before falling into the main body of liquid below it.

By such means the distillation is expeditiously and effectively performed by reason of the conditions under which heat is imparted to the liquid and by reason of the facility afforded for the vapours of the constituents having relatively low boiling points to be disengaged from the liquid above, and before it reaches the main body of liquid in the still, and that too without the necessity of employing any means for stirring or atomizing the liquid.

The invention comprises the construction which is hereinafter described.

The invention is diagrammatically illustrated and by way of example in the accompanying drawings, in which—

In carrying the invention into effect in the construction of a still for the distillation of tar, I employ a simple cylindrical vertical still $a$ such as ordinarily employed, mounted within the usual brickwork setting. I feed the tar in a continuous stream through a feed pipe $b$ which passes downward through the main body of heated tar to the bottom of the still, where it is connected by means of a branch pipe $e$ with two or more circular pipes $c$ $d$.

The pipes $c$ and $d$ are disposed near the bottom of the still and the tar passes from these circular pipes $c$ and $d$ upwardly through the two series of vertical pipes $c^1$ $d^1$ which extend through the heated tar which fills the still up to the discharge level $h$. The vertical pipes $c^1$ $d^1$ pass through and discharge immediately above the bottom of a shallow tank or tray $f$ which is disposed in a horizontal position near the top of the still above the surface of the body of liquid therein, and the tray is supported by suspension rods fitted with nuts above and beneath the outwardly extending flange of the tray, by which the level of the tray may be adjusted. The upper ends of the pipes $c^1$ $d^1$ extend into the tray and the level of the tar in the tray is maintained above the orifices of these pipes by means of V-shaped notches $f^1$ cut in the edge of the outer wall of the tray.

Thus after being heated to the temperature required to disengage the vapours which it is required to remove from the tar before mixing it with the partly distilled tar in the body of the still it flows out of the tray in a number of streams through the V-shaped notches.

By thus subjecting the tar or liquid in streams gradually to heat through pipes disposed in the heated liquid in the still, the liquid is caused to acquire gradually the temperature necessary to the distillation or for the commencement of the distillation, and immediately thereupon to overflow in the upper part of the still under conditions favourable to the disengagement of the lighter vapours and their immediate removal from the still. By such means the distillation is expedited and is effected with efficiency in the utilization of heat.

The liquid or tar after being further heated and distilled as it passes down the still is withdrawn from the lower part through the outlet pipe $h$ which passes up the still, and then passes if desired to the feed pipe $b$ of another still and so on, so that the distillation is continuous and the flow of the tar from still to still is effected by gravitation or otherwise.

Figure 1:
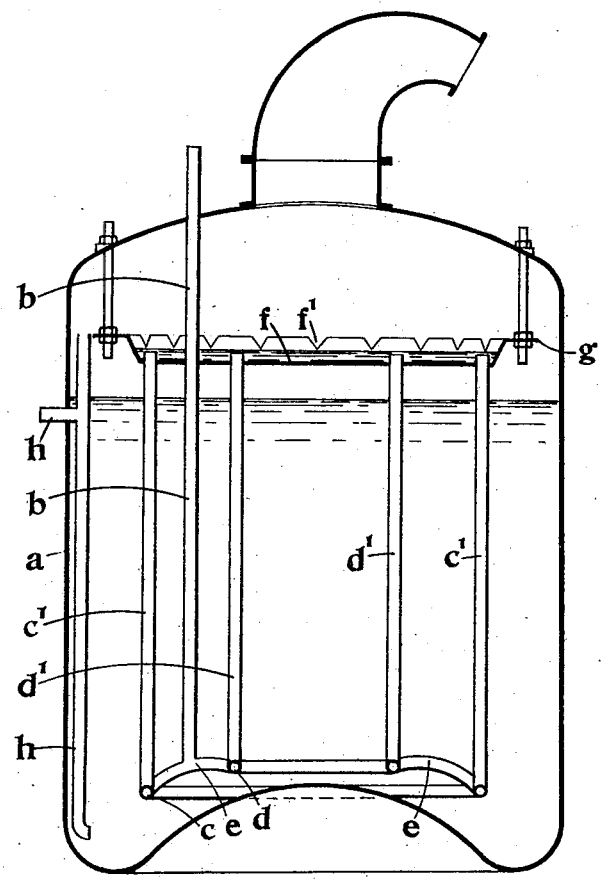
Figure 1 represents a diagrammatic sectional elevation of a still provided for use according to the invention.
Figure 2:
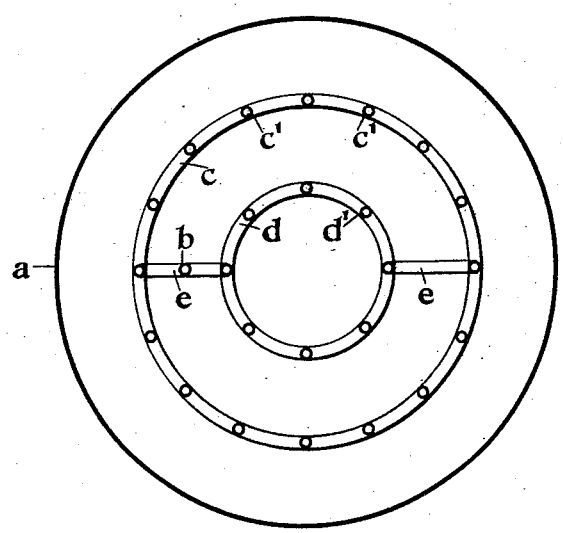
Figure 2 is a corresponding diagrammatic sectional plan.
Figure 3:
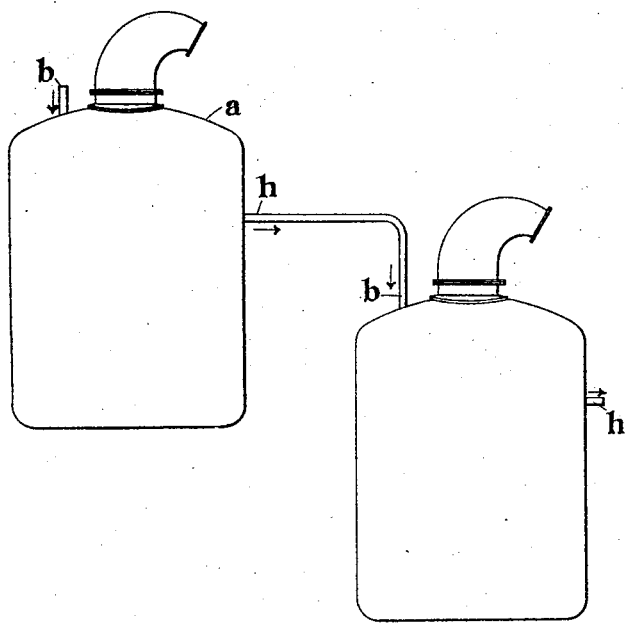
Figure 3 is a diagram showing a number of stills arranged for fractionation.

A series of such stills may be provided for the continuous fractional distillation of tar as diagrammatically illustrated in Figure 3, in the first of which the water and light oils may be removed from the tar, in the second the middle oils, in the third creosote oil, in the fourth anthracene oil; or the stills may be otherwise arranged for fractional distillation as may be necessary according to the character of the tar or liquid and the fractions required.

The tar is advantageously first passed through a heater or heat exchanger before being fed into the still, in which the heat may be provided by the hot residuum leaving the still.

It will be understood that the invention is applicable to any existing simple still.

The invention is not limited to the constructional form of still diagrammatically illustrated in the drawing. It is obvious that the invention may be carried into effect in another construction than that illustrated. For example, the system of pipes through which the tar is led before passing into the tray may be arranged in any other way to permit of the tar being heated in streams passing through the body of liquid in the still, or otherwise in order that the tar may gradually acquire the temperature necessary for the distillation to be effected or commenced before the liquid is passed to the upper part of the still for the disengagement of the lighter vapours of the liquid. Or again any number of trays may be provided. Furthermore the tray or trays may be superheated as for example by steam being passed under the tray or trays through a closed jacket or through an open pipe or otherwise, or the pipes may discharge through their open ends into the still and the use of the tray dispensed with.

I claim:

1. A method of continuous distillation of liquid in a still subject to external heat, consisting in causing the liquid to be distilled to be fed into the still in a plurality of upward streams through but not in contact with the main bulk of liquid in the still under conditions in which the liquid fed gradually acquires the temperature necessary for the distillation to be effected, the said liquid passing to the upper part of the still above the bulk of liquid therein where the lighter fractions are disengaged for removal from the still, the liquid then passing into the main bulk of liquid in the still, substantially as described.

2. A still consisting of a vessel subject to external heat and a plurality of pipes within the said vessel through which the liquid to be distilled passes upwardly in a plurality of streams, the said pipes passing up through the bulk of liquid in the still and extending from near the bottom of the still into a position above the level of the bulk of liquid within the still, whence the liquid to be distilled discharges into the still, substantially as described.

3. A still consisting of a vessel such as commonly used for the distillation of tar but containing within its upper part a shallow tray, and a plurality of pipes disposed to extend upwardly through the liquid in the still, the upper ends of the said plurality of pipes discharging into the said tray while the lower ends are connected to the supply of the liquid to be distilled, substantially as described.

4. A still consisting of a vessel such as commonly used for the distillation of tar, a shallow tray disposed in the upper part of the said vessel and above the level of liquid therein, a series of vertical pipes extending through the liquid within the still and having their upper ends discharging into the said tray, the lower ends of the said pipes being connected together by a common pipe and a pipe connected to the latter for the supply of the liquid to be distilled, substantially as described.

JOHN LEWIS MAJOR.